(12) United States Patent
Berisha et al.

(10) Patent No.: US 10,994,443 B2
(45) Date of Patent: May 4, 2021

(54) DIAMOND WIRE CUTTING METHOD FOR CRYSTAL BOULES

(71) Applicant: COMADUR S.A., Le Locle (CH)

(72) Inventors: Naser Berisha, Wettingen (CH); Roland Dechant-Wagner, Villingen-Schwenningen (DE); Christian Russi, Le Locle (CH)

(73) Assignee: COMADUR S.A., Le Locle (CH)

( * ) Notice: Subject to any disclaimer, the term of this patent is extended or adjusted under 35 U.S.C. 154(b) by 364 days.

(21) Appl. No.: 15/988,258

(22) Filed: May 24, 2018

(65) Prior Publication Data
US 2019/0022895 A1    Jan. 24, 2019

(30) Foreign Application Priority Data
Jul. 18, 2017    (EP) .................................... 17181836

(51) Int. Cl.
| B28D 5/04 | (2006.01) |
| B28D 5/00 | (2006.01) |
| B23B 27/16 | (2006.01) |

(52) U.S. Cl.
CPC ........... B28D 5/045 (2013.01); B28D 5/0082 (2013.01); B28D 5/0088 (2013.01); *B23B 27/1685* (2013.01)

(58) Field of Classification Search
CPC .... B28D 5/045; B28D 5/0082; B28D 5/0088; B23B 27/1685; B29C 70/70
USPC .............................. 125/21; 264/271.1, 279.1
See application file for complete search history.

(56) References Cited

U.S. PATENT DOCUMENTS

| 2,324,768 | A | * | 7/1943 | Crawford | ........... | B29D 99/0042 |
| | | | | | | 264/265 |
| 3,188,370 | A | * | 6/1965 | Gotzy | ..................... | B29C 70/70 |
| | | | | | | 264/226 |
| 3,202,742 | A | * | 8/1965 | Bachelder | ............... | B29C 70/62 |
| | | | | | | 264/74 |
| 3,208,750 | A | * | 9/1965 | Firth | ....................... | B29C 39/42 |
| | | | | | | 473/125 |
| 4,326,494 | A | * | 4/1982 | Demers | ..................... | B28D 5/00 |
| | | | | | | 125/12 |
| 4,410,387 | A | * | 10/1983 | Halkerston | ........... | E21B 33/138 |
| | | | | | | 156/245 |

(Continued)

FOREIGN PATENT DOCUMENTS

| DE | 10 2004 043 718 A1 | 3/2006 |
| WO | WO 2010/009881 A1 | 1/2010 |

OTHER PUBLICATIONS

European Search Report dated Dec. 14, 2017 in European Application 17181836.2 filed on Jul. 18, 2017 (with English Translation of Categories of cited documents).

*Primary Examiner* — George B Nguyen
(74) *Attorney, Agent, or Firm* — Oblon, McClelland, Maier & Neustadt, L.L.P.

(57) ABSTRACT

Method for cutting crystal boules using diamond wire, wherein this boule is driven about a main axis, a cutting wire is held taut and driven through a temporary drum immobilising each boule in position with respect to the main axis throughout the entire cutting operation, this temporary drum being made by overmoulding a coating material on at least one boule bonded onto a sacrificial core, the cutting being followed by the slicing of cut rings from which are detached, particularly using heat, crystalline plates with parallel faces.

16 Claims, 1 Drawing Sheet

(56) References Cited

U.S. PATENT DOCUMENTS

| | | | | |
|---|---|---|---|---|
| 5,771,876 | A * | 6/1998 | Egglhuber | B23D 57/0023 |
| | | | | 125/21 |
| 8,259,901 | B1 * | 9/2012 | Kamireddi | C30B 33/00 |
| | | | | 378/81 |
| 8,980,151 | B2 * | 3/2015 | Chou | B29D 99/0042 |
| | | | | 264/248 |
| 2011/0084422 | A1 * | 4/2011 | Binette | A63B 37/0027 |
| | | | | 264/279.1 |
| 2012/0128814 | A1 * | 5/2012 | Moulin | B29C 45/162 |
| | | | | 425/588 |
| 2015/0203986 | A1 * | 7/2015 | Sauar | B28D 5/045 |
| | | | | 136/261 |
| 2015/0228505 | A1 * | 8/2015 | Ottobon | H01L 21/568 |
| | | | | 264/272.14 |
| 2016/0038792 | A1 * | 2/2016 | Chen | A63B 37/0076 |
| | | | | 473/376 |
| 2017/0136655 | A1 * | 5/2017 | Jeronimo | B28D 5/045 |

* cited by examiner

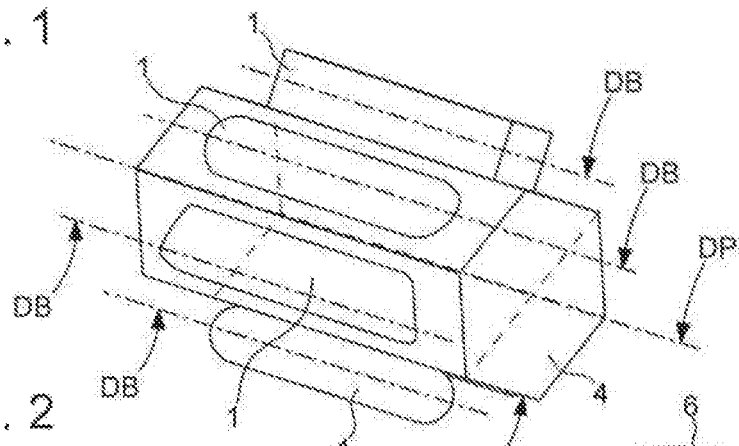
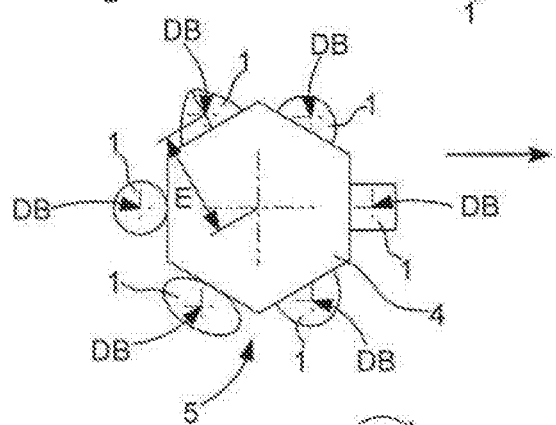
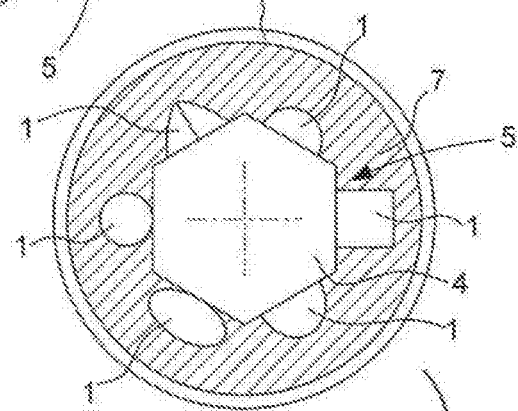
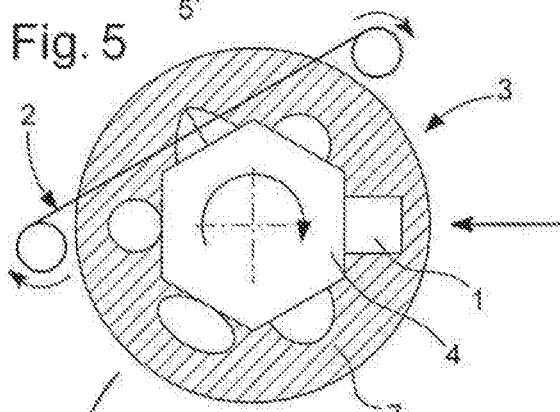
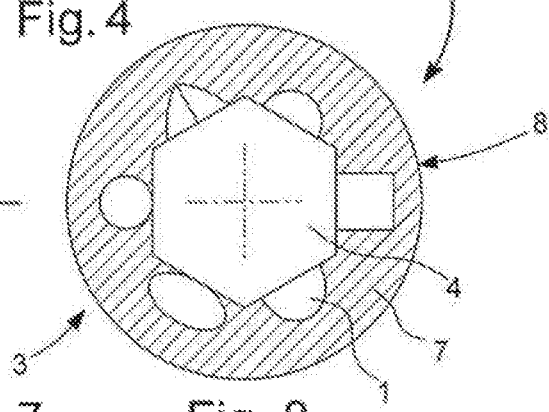
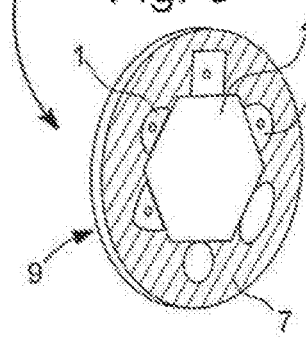
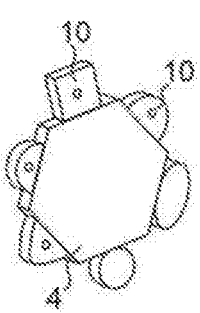
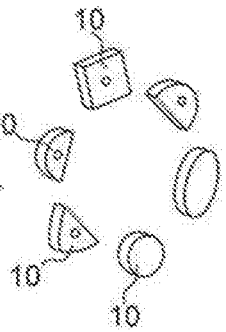

DIAMOND WIRE CUTTING METHOD FOR CRYSTAL BOULES

This application claims priority from European Patent Application No. 17181836.2 filed on Jul. 18, 2017, the entire disclosure of which is hereby incorporated herein by reference.

FIELD OF THE INVENTION

The invention concerns a method for cutting at least one crystal boule using cutting wire, particularly diamond wire, to produce crystalline plates.

The invention concerns the field of manufacturing crystalline components for horology and jewelry, and more particularly components inscribed between two parallel faces, such as watch crystals or similar.

BACKGROUND OF THE INVENTION

The cutting of crystal boules is a complex operation, due to the difficulty in holding these raw materials, which are irregularly shaped. Their hardness requires diamond wire cutting. Cutting is an expensive operation, which is also very sensitive to vibrations, and to any impurities encountered. It is, moreover, difficult to produce discs with perfectly parallel faces, and free from scratches or abrasive marks.

Patent Application No DE102004043718A1 in the name of SILTRONIC discloses a method for cutting wafers from rods or crystals of brittle material, for example a semiconductor crystal, with two or more workpieces placed on a rotating mount offered up to a diamond saw with a number of parallel wires. The workpiece holder rotates about a central axis and is fitted to an indexing drive to feed the workpieces onto the saw. The overall cutting action results from a combination of the reciprocating saw drive and the rotating drive of the workpiece holder.

Patent Application No WO 2010/009881 in the name of MEYER BURGER AG also discloses a multi-wire cutting device with a rotating workpiece holder and a method for cutting solid substrates, for example, for use as wafers in the semiconductor, photovoltaic, optical, ceramics, electrical and magneto-technical industry.

SUMMARY OF THE INVENTION

The invention proposes to develop a method that masters the operation of cutting crystal boules, allowing the simultaneous cutting of several crystal boules, ensuring control of production costs, particularly in terms of saving diamond wire and cutting time, and guaranteeing a well finished product.

To this end, the invention concerns a method for cutting at least one crystal boule.

BRIEF DESCRIPTION OF THE DRAWINGS

Other features and advantages of the invention will appear upon reading the following detailed description, with reference to the annexed drawings, in which:

FIG. 1 represents a schematic and perspective view of a bonded assembly comprising a sacrificial core around which are bonded several untreated crystal boules after a surface preparation.

FIG. 2 represents a schematic, end view of the bonded assembly of FIG. 1.

FIG. 3 represents, in a similar manner to FIG. 2, the same bonded assembly, inserted into an envelope serving as mould, in which it is overmoulded with a coating material.

FIG. 4 represents, in a similar manner to FIG. 3, the overmoulded assembly after the overmoulding operation of FIG. 3 and removal from the envelope, and after heat stabilisation, where it forms a temporary drum ready to be cut.

FIG. 5 represents, in a similar manner to FIG. 4, the operation of cutting this temporary drum, through which a cutting wire moves, represented, in a simplified manner, between two rollers.

FIG. 6 represents a schematic and perspective view of a cut ring obtained, at the end of the cutting operation, by cutting off any remaining elements of the sacrificial core and of the coating material, to separate it completely from the rest of the temporary drum.

FIG. 7 represents a schematic and perspective view of what remains of this cut ring after removal of the rest of the coating material.

FIG. 8 represents a schematic and perspective view of the crystalline plates that remain after removal of the adhesive and of the rest of the sacrificial core.

DETAILED DESCRIPTION OF PREFERRED EMBODIMENTS

The invention concerns a method for cutting at least one crystal boule 1, of the sapphire or ruby boule type or similar, using cutting wire, particularly diamond wire, to produce crystalline plates 10.

More particularly, there is determined a boule axis DB, perpendicularly to which it is chosen to cut this at least one boule 1, with a boule radius RB.

This boule radius RB determines the dimension of the crystalline plate 10 obtained from the cutting operation, and thus of the products that will be extracted therefrom, such as watch crystals or suchlike.

The cutting is performed by driving boule 1 about a main axis DP parallel to boule axis DB. More particularly, this main axis DP is separated from boule axis DB by an eccentricity E greater than boule radius RB.

A cutting wire 2 is held taut and driven along a straight segment in a plane perpendicular to main axis DP, in particular but not limited to between a soft approach position, wherein the distance separating cutting wire 2 from main axis DP has a value that is equal to the sum of eccentricity E and boule radius RB, and a separation position, wherein the distance separating cutting wire 2 from main axis DP has a value equal to the difference between eccentricity E and boule radius RB.

According to the invention, there is made a temporary drum 3 which immobilises this at least one boule 1 in position with respect to main axis DP throughout the entire cutting operation, during which boule axis DB is made to pass on either side of the straight segment embodying cutting wire 2 during the cutting of this at least one boule 1 inside temporary drum 3.

In particular, temporary drum 3 is rotated during cutting with diamond wire 2. More particularly, its rotational speed is constant, and the speed of motion of diamond wire 2 is also constant.

More particularly, and in a non-limiting manner, the straight segment corresponding to the engagement of cutting wire 2 in temporary drum 3, at a given instant, is perpendicular to a radial line originating from main axis DP, which coincides with the axis of the drum, and this segment is symmetrical with respect to this radial line.

More particularly, this temporary drum 3 is arranged for the simultaneous cutting of a plurality of such boules 1, each arranged radially in the same manner with respect to main axis DP.

Advantageously, temporary drum 3 is based on a sacrificial core 4, formed, in a non-limiting manner, by an axial tube or cylinder, whose axis of revolution coincides with main axis DP, and whose radius is equal to the difference between eccentricity E and boule radius RB. Then, after suitable preparation, each boule 1 is bonded onto this sacrificial core 4, oriented with its boule axis DB parallel to main axis DP, to form a bonded assembly 5.

In another particular and non-limiting variant, bonding is performed using a commercial product, for example a two-component adhesive, formed of an epoxy resin and a curing agent, such as 1,4,7,10-tetra-azadecane, together forming a polyepoxide after mixing and curing, particularly from the Huntsman Araldite® family of products, or any other adhesive suitable for the materials to be assembled.

In another particular and non-limiting variant, bonding is performed using another commercial product, for example, a methacrylate, a cyanoacrylate, or any other suitable adhesive, for example an anaerobic Henkel® Loctite® 641 adhesive, which is a methacrylate ester that can be used up to 150° C., and which is very easy to melt at 250° C., for example by hot air flow.

In a particular application, boule 1 extends longitudinally and has a substantially cylindrical shape, at least in its central part; boule axis DB is, in that case, the axis of this cylinder.

More particularly, boules 1 are bonded substantially parallel to each other, with a distance between them comprised, if possible, between 4 mm and 6 mm.

In a particular application for the manufacture of timepiece components, the external diameter of temporary drum 3 is on the order of 240 mm, and the cutting depth is comprised between 30 mm and 55 mm in drum 3, the smallest internal support diameter of the boules is close to 130 mm. Naturally, this method can be implemented with other dimensional characteristics without departing from the invention.

Owing to the perfectly continuous nature of the cutting operation, the invention allows a saving of diamond wire 2 and of operating time, while guaranteeing that the edges thus cut have a very regular surface state in the crystalline plate 10 obtained at the end of the operations. Finishing by polishing, well known to those skilled in the art, is not addressed here.

Advantageously, preparation is achieved by subjecting each boule to sandblasting, or micro sandblasting, or peening, or suchlike, and then cleaning it with alcohol or another solvent to remove any grease and solid particles, so that diamond wire 2 does not encounter any particles liable to accelerate wear.

More particularly, once boules 1 are bonded onto sacrificial core 4, the bonded assembly 5 thereby formed is inserted into an envelope 6 serving as mould, inside which this bonded assembly 5 is overmoulded with a polymer coating 7, such as an epoxy resin, or similar, with a particular viscosity, which is left to cure for the necessary time, particularly for at least 24 hours, by cooling to maintain a substantially constant temperature, to form an overmoulded assembly 8. This cooling can be performed with a stream of cold water at ambient temperature and prevents the coating product reaching too high a temperature and thus prevents stresses causing heterogeneities.

Next, following curing of coating product 7, notably of the epoxy resin, the overmoulded assembly 8 thereby formed is removed from its envelope, which advantageously is recyclable, and tempered, and in particular tempered for at least 12 hours at a temperature comprised between 40° C. and 50° C., to obtain temporary drum 3.

The actual cutting operation is thus applied to temporary drum 3: temporary drum 3 is sliced, by advancing diamond wire 2 radially towards main axis DP, at least up to the separation position, to form blanks of cut rings 9.

The separation of these cut rings 9 is completed by cutting off sacrificial core 4, by turning or another tool machining, or other means.

Coating 7, particularly of epoxy resin or similar, is then removed from cut rings 9 by increasing temperature and/or soaking in a heated fluid and/or in a tumbling device or suchlike, to release crystalline plates 10 with two parallel faces. Removal of the adhesive can be carried out at the same time, or in a separate operation, particularly by increasing temperature, depending on the materials chosen for the coating and for the bonding.

More particularly, this method is applied to a sapphire or ruby crystal boule.

More particularly, this method is applied to the manufacture of watch crystals, by shaping and finishing the crystalline plates thus obtained.

More particularly, this method is applied to the manufacture of jewels for horology, by shaping and finishing the crystalline plates thus obtained.

The invention provides a significant saving of diamond wire 2, control of a reduced cutting time, and guarantees that crystalline plates 10 are obtained with two perfectly parallel main faces and a very regular surface state.

What is claimed is:

1. A method for cutting at least one crystal boule using diamond wire, comprising:
    determining a boule axis, perpendicularly to which it is chosen to cut said at least one boule with a boule radius, and
    driving said boule about a main axis parallel to said boule axis, and a cutting wire is held taut and driven along a straight segment in a plane perpendicular to said main axis,
    wherein there is made a temporary drum which immobilises said at least one boule in position with respect to said main axis throughout an entire cutting operation, during which said boule axis is made to pass on either side of said straight segment during the cutting of said at least one boule inside said temporary drum,
    wherein said temporary drum is based on a sacrificial core formed by an axial tube or cylinder, whose axis of revolution coincides with said main axis, and whose radius is equal to a difference between an eccentricity and said boule radius, on which sacrificial core is bonded, after preparation, each said boule oriented with its boule axis parallel to said main axis, to form a bonded assembly,
    wherein, once said at least one boule is bonded onto said sacrificial core, said bonded assembly is inserted into an envelope inside which said bonded assembly is overmoulded with a coating material, which is left to cure to form an overmoulded assembly,
    wherein, after curing of said coating material, said overmoulded assembly is removed from said envelope, and tempered to obtain said temporary drum, and wherein said preparation of each said boule is carried out by subjecting said boule to sandblasting or micro sandblasting or peening, then cleaning it with alcohol or another solvent to remove any grease and solid particles.

2. The cutting method according to claim 1, wherein said main axis is separated from said boule axis by an eccentricity greater than said boule radius, in that said cutting wire is held taut and driven between a soft approach position, wherein a distance separating said cutting wire from said main axis has a value equal to a sum of said eccentricity and said boule radius, and a separation position, wherein the distance separating said cutting wire from said main axis has a value equal to the difference between said eccentricity and said boule radius.

3. The cutting method according to claim 1, wherein said main axis is separated from said boule axis by an eccentricity greater than said boule radius, in that said cutting wire is held taut and driven between a soft approach position, wherein a distance separating said cutting wire from said main axis has a value equal to a sum of said eccentricity and said boule radius, and a separation position, wherein the distance separating said cutting wire from said main axis has a value equal to the difference between said eccentricity and said boule radius.

4. The cutting method according to claim 1, wherein said temporary drum is arranged for simultaneous cutting of a plurality of said boules, each arranged radially in the same manner with respect to said main axis.

5. The cutting method according to claim 1, wherein said temporary drum is sliced, by advancing diamond wire radially towards said main axis, at least up to a separation position, to form blanks of cut rings.

6. The cutting method according to claim 5, wherein the separation of said cut rings is finished by cutting off said sacrificial core by turning or another tool machining.

7. The cutting method according to claim 6, wherein said coating material or an epoxy resin is removed from said cut rings by increasing temperature and/or soaking in a heated fluid and/or in a tumbling device, to release crystalline plates with two parallel faces.

8. The cutting method according to claim 1, wherein said crystal boule is chosen to be made of sapphire or ruby.

9. An application of the cutting method according to claim 7, to the manufacture of watch crystals, wherein shaping and finishing operations are performed on said crystalline plates made according to said method.

10. An application of the cutting method according to claim 7, to the manufacture of horological jewels, wherein shaping and finishing operations are performed on said crystalline plates made according to said method.

11. A method for cutting at least one crystal boule using diamond wire, comprising:
    determining a boule axis, perpendicularly to which it is chosen to cut said at least one boule with a boule radius, and
    driving said boule about a main axis parallel to said boule axis, and a cutting wire is held taut and driven along a straight segment in a plane perpendicular to said main axis,
    wherein there is made a temporary drum which immobilises said at least one boule in position with respect to said main axis throughout an entire cutting operation, during which said boule axis is made to pass on either side of said straight segment during the cutting of said at least one boule inside said temporary drum,
    wherein said temporary drum is based on a sacrificial core formed by an axial tube or cylinder, whose axis of revolution coincides with said main axis, and whose radius is equal to a difference between an eccentricity and said boule radius, on which sacrificial core is bonded, after preparation, each said boule oriented with its boule axis parallel to said main axis, to form a bonded assembly,
    wherein, once said at least one boule is bonded onto said sacrificial core, said bonded assembly is inserted into an envelope inside which said bonded assembly is overmoulded with a coating material, which is left to cure to form an overmoulded assembly,
    wherein, after curing of said coating material, said overmoulded assembly is removed from said envelope, and tempered to obtain said temporary drum, and
    said temporary drum is sliced, by advancing diamond wire radially towards said main axis, at least up to a separation position, to form blanks of cut rings.

12. The cutting method according to claim 11, wherein the separation of said cut rings is finished by cutting off said sacrificial core by turning or another tool machining.

13. The cutting method according to claim 12, wherein said coating material or an epoxy resin is removed from said cut rings by increasing temperature and/or soaking in a heated fluid and/or in a tumbling device, to release crystalline plates with two parallel faces.

14. The cutting method according to claim 11, wherein said crystal boule is chosen to be made of sapphire or ruby.

15. The cutting method according to claim 11, wherein said main axis is separated from said boule axis by an eccentricity greater than said boule radius, in that said cutting wire is held taut and driven between a soft approach position, wherein a distance separating said cutting wire from said main axis has a value equal to a sum of said eccentricity and said boule radius, and a separation position, wherein the distance separating said cutting wire from said main axis has a value equal to the difference between said eccentricity and said boule radius.

16. The cutting method according to claim 11, wherein said temporary drum is arranged for simultaneous cutting of a plurality of said boules, each arranged radially in the same manner with respect to said main axis.

\* \* \* \* \*